(12) United States Patent
Lundberg (10) Patent No.: US 9,457,470 B2
(45) Date of Patent: Oct. 4, 2016

(54) ROBOT SYSTEM AND METHOD FOR CALIBRATION

(71) Applicant: ABB Technology Ltd, Zurich (CH)

(72) Inventor: Ivan Lundberg, Västerås (SE)

(73) Assignee: ABB Technology Ltd, Zurich (CH)

( * ) Notice: Subject to any disclaimer, the term of this patent is extended or adjusted under 35 U.S.C. 154(b) by 0 days.

(21) Appl. No.: 14/781,774

(22) PCT Filed: Apr. 5, 2013

(86) PCT No.: PCT/EP2013/057227
§ 371 (c)(1),
(2) Date: Oct. 1, 2015

(87) PCT Pub. No.: WO2014/161603
PCT Pub. Date: Oct. 9, 2014

(65) Prior Publication Data
US 2016/0039094 A1 Feb. 11, 2016

(51) Int. Cl.
*B25J 9/16* (2006.01)
(52) U.S. Cl.
CPC ............ *B25J 9/1692* (2013.01); *B25J 9/1607* (2013.01); *B25J 9/1697* (2013.01); *G05B 2219/39008* (2013.01); *Y10S 901/09* (2013.01)
(58) Field of Classification Search
CPC .... B25J 9/1692; B25J 9/1607; B25J 9/1697; G05B 2219/39008; G05B 2219/39016; G05B 2219/39021; G05B 2219/39022; G05B 2219/40545; G05B 2219/40611; G05B 19/4086; Y10S 901/09; G06T 7/08
See application file for complete search history.

(56) References Cited

U.S. PATENT DOCUMENTS

| 7,019,825 B2 | 3/2006 | Roh et al. |
| 2009/0118864 A1 | 5/2009 | Eldridge et al. |
| 2011/0280472 A1 | 11/2011 | Wallack et al. |
| 2011/0320039 A1 | 12/2011 | Hsu et al. |

FOREIGN PATENT DOCUMENTS

WO 2012076038 A1 6/2012

OTHER PUBLICATIONS

Tsai, Roger Y. et al.: "A New Technique for Fully Autonomous and Efficient 3D Robotics Hand/Eye Calibration", IEEE Transactions on Robotics and Automation, vol. 5, No. 3, Jun. 1989, pp. 345-358.
International Search Report & Written Opinion of the International Searching Authority Application No. PCT/EP2013/057227 Completed: Jan. 9, 2014; Mailing Date: Jan. 21, 2014 7 pages.
Malm, Henrik, et al. "Simplified Intrinsic Camera Calibration and Hand-Eye Calibration for Robot Vision" Proceedings of the 2003 IEEE/RSJ Intl. Conference on Intelligent Robots and Systems, Las Vegas, Nevada—Oct. 2003. pp. 1037-1043.

*Primary Examiner* — Abby Lin
(74) *Attorney, Agent, or Firm* — Whitmyer IP Group LLC (57) ABSTRACT

A method and a system for calibrating a first coordinate system $R_r$ of a robot unit with a second coordinate system $C_f$ of an object identification unit, wherein the robot unit includes a robot arm with an end effector and the object identification unit includes a camera unit. The calibration is performed using a calibration marker on the end effector. The method determines the intrinsic and the extrinsic parameters of the camera unit in two steps, a first step where the intrinsic parameters and a rotational part of the extrinsic parameters are determined, and a second step where a translational part of the extrinsic parameters are determined.

12 Claims, 3 Drawing Sheets

ROBOT SYSTEM AND METHOD FOR CALIBRATION

FIELD OF THE INVENTION

The present invention relates to techniques for calibration of a coordinate system of an object identification unit to a coordinate system of a robot unit.

BACKGROUND OF THE INVENTION

A camera can be used to aid a robot in different tasks such as finding and grasping objects. The camera then acts as a visual sensor to the robot. However, to be able to coordinate what the camera senses with actions of the robot, the relationship between the coordinate system of the camera and the coordinate system of the robot has to be known. This can be done by calibrating the camera to a coordinate system common with a coordinate system of the robot.

The calibration problem can be seen as determining the intrinsic and the extrinsic parameters of the camera. The intrinsic parameters define the focal length and the aspect ratio of the camera, i.e. the ratio between the width and the height of the imaging elements in the camera, and skew. The extrinsic parameters of the camera are the parameters that describe the geometrical relationship between the coordinate system of the camera and the coordinate system of the robot. This geometrical relationship can also be referred to mathematically as a pose.

A traditional approach to determine the extrinsic parameters of the camera is to calibrate the camera towards a 2D (two dimensional) checkerboard. A corresponding frame is then manually pointed out by first defining a robot TCP (Tool Center Point) and then jogging the pointing tool to points of the checkerboard that define the work object. A relationship between the coordinate system of the camera and the coordinate system of the robot can then be determined. This manual camera calibration has a plurality of drawbacks. For example, it is often difficult to point out an accurate TCP and also to point out an accurate work object on the checkerboard. The procedure takes long time and often gives a poor result. It is also difficult for the user to know if the end result is accurate as there is no feedback regarding the obtained accuracy. Since the calibration is based on a 2D checkerboard, it gives no 3D (three dimensional) information; and it is thus not possible to use the calibration result for 3D applications.

WO2012076038A1 discloses a method for calibrating a first coordinate system of a robot unit with a second coordinate system of an object identification unit comprising a camera unit. The method comprises generating a plurality of target points to which a calibration tool is to be moved by the robot unit for calibration, evaluating the target points for visibility of the camera unit and range of distance from the camera unit, and moving the target points towards the camera unit until the target point are either maintained or rejected, generating a robot program based on the maintained target points, and executing the robot program while calibrating the first coordinate system with the second coordinate system From "Simplified Intrinsic Camera Calibration and Hand-Eye Calibration for Robot Vision" by Maim et al, Proceedings of the 2003 IEEE/RSJ, Intl. Conference on Intelligent Robots and Systems, Las vegas, Nev.; October 2003; p. 1037-1043, a method for calibrating a camera is explained. Intrinsic camera calibration and hand-eye calibration is performed on a stereo head configuration of two cameras mounted on a tool flange of the robot. The method uses a checkerboard to make direct pose estimates of the robot. If instead having a stationary camera, the checkerboard has to be attached to the tool flange. The checkerboard has to have a considerable size to give good calibration accuracy. Because calibration preferably should be done periodically to confirm the calibration, and because it should be possible to re-make the calibration if new conditions arises, it is desired to have the checkerboard constantly attached to the tool flange such that the operator does not have to re-attach the checkerboard to the tool flange every time a calibration shall be done. However, having a large checkerboard constantly attached to the tool flange becomes unpractical. Also, for the case with one or several cameras attached to the tool flange, it is not always reasonable to have a large checkerboard permanently placed in the working area of the robot.

There is thus a need for an alternative calibration method which works with a small marker that without difficulties can be constantly attached to the robot. In particular, the method should work with a marker that is suitable for position measurements only, thus a 2D marker.

It is therefore an object of the present invention to provide a calibration method to calibrate a vision camera to a robot using a 2D marker. In particular, the method should essentially be made without manual intervention.

SUMMARY OF THE INVENTION

According to one aspect, the object is achieved by a method for calibrating a first coordinate system $R_f$ of a robot unit with a second coordinate system $C_f$ of an object identification unit according to the first independent claim. The robot unit comprises a robot arm with an end effector and the object identification unit comprises a camera unit. The end effector further comprises a calibration marker. The method comprises:

moving the end effector to a plurality of first target points wherein the first target points are chosen to include movement of the end effector in all three axes of the first coordinate system $R_f$ of the robot unit and wherein the end effector maintains a same orientation, while generating position measurements in the first coordinate system $R_f$ and position measurements in an image plane coordinate system $IP_f$ for the calibration marker with the object identification unit for each first target points;

calculating intrinsic parameters $C_{int}$ of the camera unit and a rotational part of the second coordinate system $C_f$ of the object identification unit based on the measurements in $R_f$ and $IP_f$;

moving the end effector to a plurality of first orientations and for each of these first orientations moving the end effector in a translation pattern while maintaining the same first orientation of the end effector and while generating position measurements in $R_f$ and $IP_f$ identifying the translation pattern;

calculating a depth value Z from the camera unit to the calibration marker for each first orientation based on the position measurements identifying the translation pattern;

transforming position measurements in pixels in $IP_f$ to position values in the second coordinate system $C_f$ based on the depth value Z and $C_{int}$;

calculating a translational part of the second coordinate system $C_f$ of the object identification unit based on the translation and reorientation between the first orientations, and using the rotational and the translational parts to store a relation between $R_f$ and $C_f$ to enable collaboration between the robot unit and the object identification unit.

With the method a fast and accurate calibration of an object identification unit to a robot unit is accomplished. The calibration can be done with a two dimensional calibration marker that can be permanently attached to the robot. There is no longer a need for time consuming teaching of a tool centre point, TCP, against a checkerboard which can take up to an hour to accomplish. The described calibration method can be done within some minutes and can be periodically executed without having to re-attach a calibration marker to the robot. The position of the calibration marker does not have to be known in advance. The calibration can thus be accurately done for different end effectors even if the calibration marker has a different placement on the end effectors. Also, if the end effector includes soft parts such as padding, the placement of the calibration marker may become changed during work or cannot be known in advance. However, as the placement of the calibration marker does not need to be known in advance, this will not be a problem.

The camera unit used may be configured to measure in pixel values u and v, and the true intrinsic parameters of the camera unit do not need to be known in advance. Thus, various kinds of camera units can be used with the method which makes the method more useful.

According to one embodiment, the step of calculating a translational part of the second coordinate system $C_f$ comprises solving a hand-eye equation $A \cdot x = b$, where A is a matrix describing rotation between different poses of the robot unit in the first orientations, and wherein b is a matrix describing a difference between the translation in $C_f$ and the translation in $R_f$ for the different poses. The hand-eye equation may be solved using a least square method.

According to one embodiment, the u and v image coordinates are transformed to Cartesian values $X_c$, $Y_c$, Z in the second coordinate system $C_f$ of the object identification unit using the relationship $(X_c, Y_c, Z_c) = C_{int}^{-1} \cdot (u, v, 1) \cdot Z$.

According to one embodiment, Z is derived from the equation $$Z = f^* \cdot \frac{m}{|u, v|}$$

where f is the local length of the camera unit, |u, v| is a length in an image and m is a length of a movement along the translation pattern.

According to one embodiment, the method comprises teaching the robot unit a subset of the plurality of first target points before moving the end effector to the plurality of first target points. Thus, the robot unit can be taught a platform of first target points and based on these taught first target points calculate the rest of the first target points.

According to one embodiment, the method comprising moving the end effector to at least three first orientations wherein the end effector has a different orientation in each of said first orientations. By making this procedure, it is possible to derive the extrinsic parameters of the camera unit.

According to one embodiment, the translation pattern is essentially orthogonal to an optical axis of the camera unit.

According to a second aspect, the object is at least partly achieved by a robot controller configured to execute any of the steps of the described method.

According to a third aspect, the object is at least partly achieved by a robot unit comprising an object identification unit, wherein the robot unit is configured to execute any of the steps of the described method. According to one embodiment, the object is achieved by a use of the robot unit.

According to a fourth aspect, the object is at least partly achieved by a computer program P in connection with a robot system, where the computer program P comprises computer instructions configured to cause a computer unit to perform the steps according to any of the steps of the method.

According to a fifth aspect, the object is at least partly achieved with a computer product comprising computer instructions, stored on a computer readable medium, to perform the method steps according to any of the steps of the method, when the computer instructions are executed on a computer unit.

According to a sixth aspect, the object is at least partly achieved by a robot system comprising a robot unit defining a first coordinate system $R_f$, wherein the robot unit comprises a robot arm with an end effector. The robot system further comprises an object identification unit defining a second coordinate system $C_f$, wherein the object identification unit comprises a camera unit, a calibration marker on the end effector, and a computer unit with a programming unit and a computer readable storage medium storing instructions operable to cause the programming unit to perform operations comprising:

moving the end effector to a plurality of first target points wherein the first target points are chosen to include movement of the end effector in all three axes of the first coordinate system $R_f$ of the robot unit and wherein the end effector maintains a same orientation, while generating position measurements in the first coordinate system $R_f$ and position measurements in an image plane coordinate system $IP_f$ for the calibration marker with the object identification unit for each first target points;

calculating intrinsic parameters $C_{int}$ of the camera unit and a rotational part of the second coordinate system $C_f$ of the object identification unit based on the measurements in $R_f$ and $IP_f$;

moving the end effector to a plurality of first orientations and for each of these first orientations moving the end effector in a translation pattern while maintaining the same first orientation of the end effector and while generating position measurements in $R_f$ and $IP_f$ identifying the translation pattern;

calculating a depth value Z from the camera unit to the calibration marker for each first orientation based on the position measurements identifying the translation pattern;

transforming position measurements in pixels in $IP_f$ to position values in the second coordinate system $C_f$ based on the depth value Z and $C_{int}$;

calculating a translational part of the second coordinate system $C_f$ of the object identification unit based on the translation and reorientation between the first orientations, and using the rotational and the translational parts to store a relation between $R_f$ and $C_f$ to enable collaboration between the robot unit and the object identification unit.

Preferred embodiments are set forth in the dependent claims and in the detailed description.

BRIEF DESCRIPTION OF THE DRAWINGS

Below the invention will be described in detail with reference to the appended figures, of which.

DETAILED DESCRIPTION OF THE INVENTION

Figure 1:
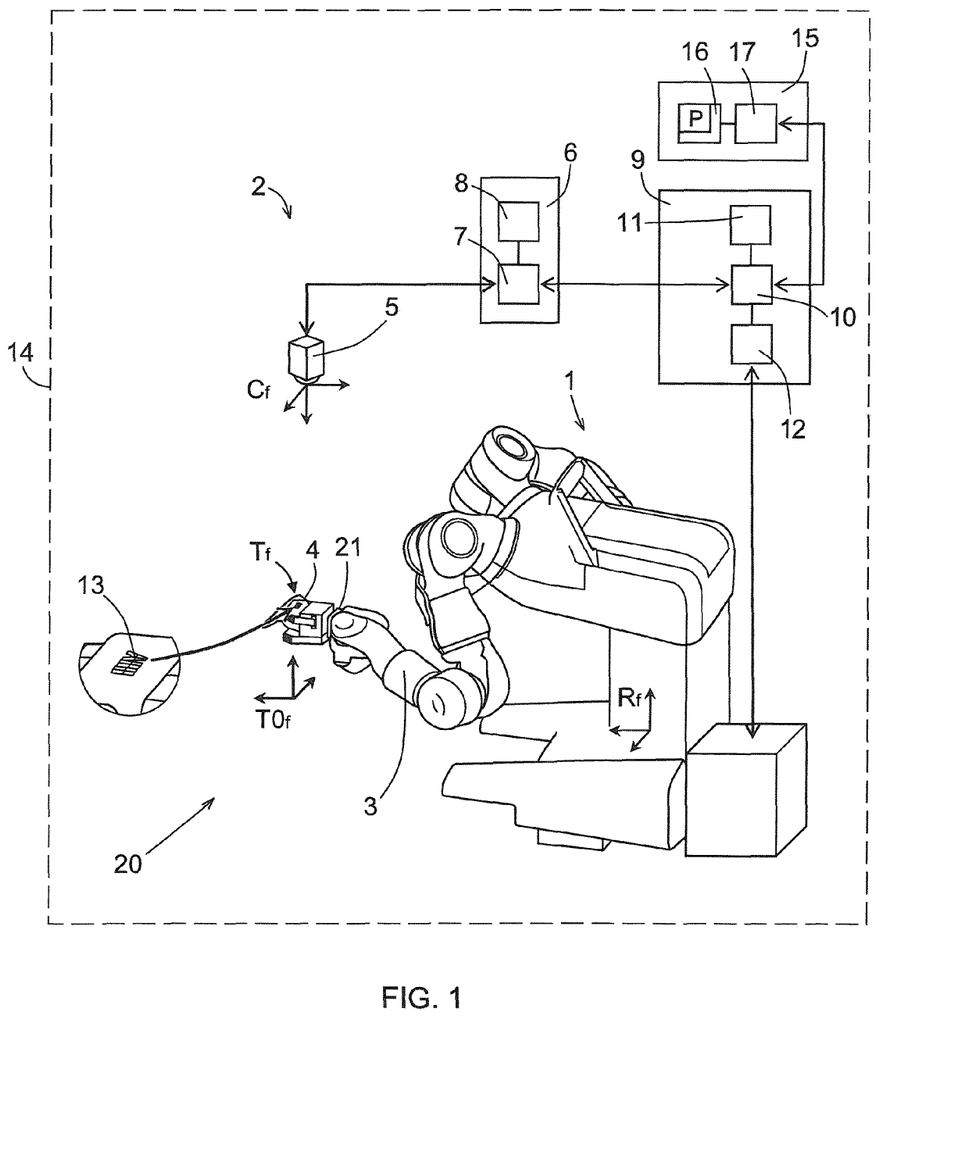
FIG. 1 illustrates a robot system according to one embodiment of the invention.

FIG. 1 illustrates an example of a robot system 14 comprising a robot unit 1 defining a first coordinate system $R_f$ and an object identification unit 2 defining a second coordinate system $C_f$. The robot unit 1 comprises a robot arm 3 with an end effector 4. The robot unit 1 is an articulated robot unit 1 and has six degrees of freedom. The robot arm 3 is also provided with a tool flange 21 defining a third coordinate system $T0_f$. The end effector 4 is attached to the tool flange 21. The relationship between the first and third coordinate systems $R_f$ and $T0_f$ is a known relationship.

The robot unit 1 and the object identification unit 2 are located at a work station 20. The robot unit 1 is configured to perform work at the work station 20.

The robot unit 1 comprises a robot controller 9 configured to control movement of the robot arm 3 by means of controlling a plurality of electric motors on the robot arm 3. The robot controller 9 comprises a programming unit 10, e.g. a computer programming unit (CPU), a computer readable storage medium 11 and a drive unit 12. The programming unit 10 is configured to execute a robot program located on the computer readable storage medium 11, wherein the robot arm 3 is moved to a plurality of positions using a plurality of robot poses. The drive unit 12 is configured to control the electric motors of the robot arm 3 in dependency of the executed robot program. The robot unit 1 is further configured to measure the pose of the tool flange coordinate system $T0_f$ using angular measurement of the joints of the robot unit 1 and a direct kinematic model of the robot unit 1.

The object identification unit 2 comprises a camera unit 5 and an information processing unit 6. The camera unit 5 is configured to be directed to the work station 20 of the robot unit 1. The information processing unit 6 comprises a programming unit 7, e.g. a CPU, and a computer readable storage medium 8. The information processing unit 6 is configured to receive information from the camera unit 5 in the form of an image of one or more objects at the work station 20. The camera unit 5 is configured to measure u and v values of the object in image coordinates in an image coordinate system $IP_f$ of the image plane 19 (FIG. 2) of the camera unit 5. The image coordinates can be either raw pixel data or data transformed to a checkerboard frame, as the calibration method that will be described works well for both kinds of data. Data from different coordinate systems will give different kinds of intrinsic parameters of the camera unit 5. The extrinsic parameters of the camera unit 5 and the calibration result will thus be the same. Thus, it is not necessary to know if the camera unit 5 has been calibrated to e.g. a checkerboard or not beforehand, which simplifies the calibration method. The information processing unit 6 is configured to process the image information so that the object is recognized and a position of the object is determined in the second coordinate system $C_f$ by means of object recognition algorithms. In particular, the object identification unit 2 is configured to measure u and v values of a calibration marker 13 on the end effector 4. The calibration marker 13 is thus located on the end effector 4. The exact location $T_f$ of the calibration marker 13 on the end effector 4 in relation to the tool flange 21 does not need to be known in advance. Consequently, the calibration marker 13 does not need to be permanently attached on the end effector 4 but it can be attached temporarily for the purpose of calibration, and it can take the form of a removable sticker, a magnet, or the like. In the FIG. 1, the calibration marker 13 is shown in an enlarged view of the end effector 4 in the shape of an "ABB"-sticker. The calibration marker 13 may however have another appearance.

Based on the position of the recognized object, the robot unit 1 is configured to move the robot arm 3 to the position of the object and perform work on the object, such as picking, welding, painting, assembling, etc. Accordingly, the robot unit 1 and the object identification unit 2 are co-operating in the work at the work station 20.

In order to enable co-operation between camera and robot, the relationship between the first coordinate system $R_f$ of the robot unit 1 and the second coordinate system $C_f$ of the object identification unit 2 has to be known. Therefore, the coordinate systems must be calibrated with each other by means of a calibration method prior to performing work at the work station 20. It shall be understood that the calibration comprises correcting one of the first and the second coordinate systems $R_f$, $C_f$ with the other of the first and the second coordinate system $R_f$, $C_f$.

The robot system 14 further comprises a computer unit 15 with a programming unit 17, e.g. a CPU, and a computer readable storage medium 16. The computer readable storage medium 16 may store a computer program P, where the computer program P comprises computer instructions configured to cause the computer unit 15 to perform the calibration method according to any of the steps of the method. The computer instructions can thus be executed by the programming unit 17, whereby the method will be performed.

The computer unit 15 is e.g. configured to generate a plurality of poses to which the end effector 4 is to be moved by the robot arm 3. A pose thus includes both an orientation and a position of the end effector 4. The computer unit 15 is further configured to cause the end effector 4 to make a plurality of translational movements, while keeping the orientation of the end effector 4 constant. The computer unit 15 is also configured to coordinate the information processing unit 6 and the robot unit 1, such that e.g. poses of the robot unit 1 and measurements made with the information processing unit 6 can be related to each other. Further, the computer unit 15 is configured to make the calculations etc. which will be described in the following.

The computer readable storage mediums 8, 11, 16 are here illustrated as independent storage areas, but might all be implemented as one computer readable storage medium. In the same way, the programming units 7, 10, 17 may be implemented as one programming unit.

Figure 2:
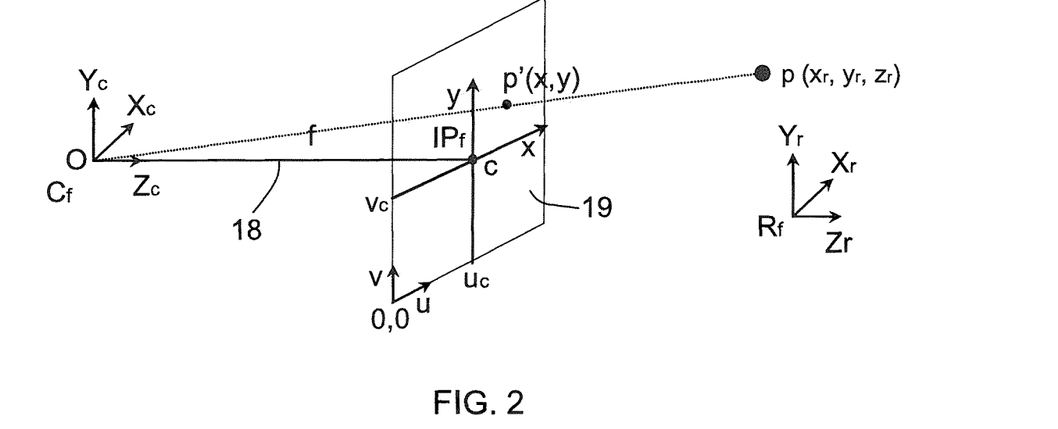
FIG. 2 illustrates a model of a pin-hole camera.

To understand how the calibration method works, a model of a pinhole camera will now be explained with reference to FIGS. 2 and 3. The camera unit 5 in this disclosure works essentially according to this model. The model illustrates the relationship between the coordinates of a 3D-point "p" and its 2D projection "p'" onto an image plane 19 of the camera unit 5.

The second coordinate system $C_f$ defines the axes $X_c$, $Y_c$, $Z_c$ and an origo "O". The location of origo "O" is also where the camera aperture of the camera unit 5 of the object identification unit 2 is. Thus, when reference is made to the second coordinate system $C_f$ of the information processing unit 6, it is equally meant the coordinate system of the camera unit 5. The $Z_c$-axis defines the optical axis 18 of the camera unit 5. In the FIG. 2, the laterally reversed version of the image plane 19 is illustrated, thus along the optical axis 18 of the camera unit 5. The image plane 19 is parallel to the axes $X_c$ and $Y_c$ and is located a distance f along the optical axis 18 from the origo O. "f" is the focal length of the camera unit 5 along the optical axis 18 of the camera unit 5.

The camera unit 5 measures the position of the projected point p'(x, y) in pixel parameter values u and v in the image plane 19. The image plane 19 has its origo 0,0 in one corner of the image plane 19. The projection p' is here defined as coordinates x, y in an image plane coordinate system $IP_f$ whose origin is at the intersection "c" of the optical axis 18 and the image plane 19, and whose x and y axes are parallel to the $X_c$ and $Y_c$ axes. $u_c$, $v_c$ denotes the intersection c between the image plane 19 and the optical axis 18. The intersection c is called the principal point or image centre. The parameter $u_c$ is thus the u pixel coordinate at the principal point, and the parameter $v_c$ is the v pixel coordinate at the principal point. In FIG. 2 the first coordinate system $R_f$ is also illustrated with axes $X_r$, $Y_r$, $Z_r$.

Figure 3:
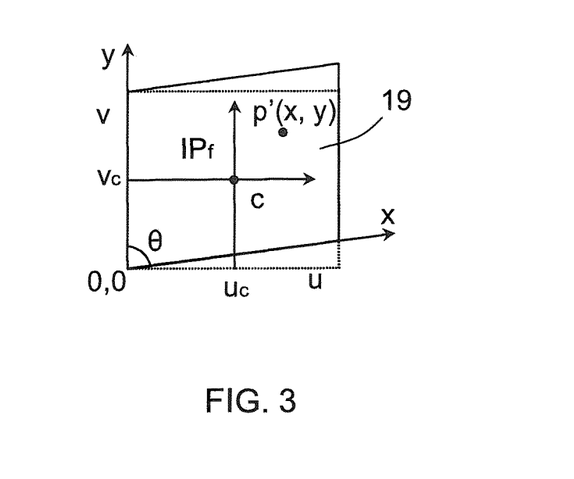
FIG. 3 illustrates an image plane of the pin-hole camera model in FIG. 3.

In FIG. 3 the relationship between the pixel coordinates in the image plane 19 and the position of the projection p' in the coordinate system $IP_f$ is illustrated. As known to a person skilled in art, an asymmetry between the image plane 19 and the coordinate system $IP_f$ can be expressed with a skew angle θ and if the pixels in the pixel coordinate system $IP_f$ are non-square this can be expressed with α and β, as is shown in eq (4).

The relationship between $C_f$ and $R_f$ can be expressed as:

$$\tilde{u} = P \cdot \tilde{U} \quad (1)$$

$$P = [C_{int} \, C_{ext}] \quad (2)$$

$$C_{ext} = [R \, T] \quad (3)$$

where ũ represents a homogeneous vector of image pixel coordinates in $IP_f$, P is a perspective projection matrix, $C_{int}$ is a matrix representing the intrinsic parameters of the camera unit 5, $C_{ext}$ is a matrix representing the external parameters of the camera unit 5, R is a matrix including the external parameters regarding rotation, T is a matrix including the external parameters regarding translation, and Ũ is a homogeneous vector of robot unit coordinates $R_f$. With the herein used denotation, this can be expressed as follows:

$$\begin{bmatrix} u \\ v \\ 1 \end{bmatrix} = \begin{bmatrix} \alpha & s & u_c & 0 \\ 0 & \beta & v_c & 0 \\ 0 & 0 & 1 & 0 \end{bmatrix} \cdot \begin{bmatrix} R & T \\ 0 & 1 \end{bmatrix} \cdot \begin{bmatrix} x \\ y \\ z \\ 1 \end{bmatrix} \quad (4)$$

$$C_{int} = \begin{bmatrix} \alpha & s & u_c & 0 \\ 0 & \beta & v_c & 0 \\ 0 & 0 & 1 & 0 \end{bmatrix} \quad (5)$$

$$C_{ext} = \begin{bmatrix} R & T \\ 0 & 1 \end{bmatrix} \quad (6)$$

where s represents the skew of the camera unit 5, and α and β are scalar values. For square pixels α will be equal to β.

The intrinsic parameters are the parameters related to the camera unit 5 itself, scaling along u and v axes (α and β), offset of u and v axes ($u_c$ and $v_c$) and skew θ between the u and v axes. The extrinsic parameters are the parameters that describe the geometrical relationship between the second coordinate system $C_f$ of the object identification unit 2 and the first coordinate system $R_f$ of the robot unit 1. This relationship can be mathematically represented as a pose, in eq. (3) denoted R and T. R is a rotation matrix describing the orientation from $R_f$ to $C_f$, and T is a translation matrix describes the translation between $R_f$ and $C_f$.

With the above relationships in mind, the calibration problem can be formulated as determining $C_{int}$ and $C_{ext}$ such that u, v measurements in $IP_f$ of a projection p' of the point p can be translated to $X_r$, $Y_r$, $Z_r$ values in $R_f$, given that a depth value Z between the camera unit 5 and the point p is known.

Before the calibration starts, it is preferably made sure that the object identification unit 2 can locate the calibration marker 13 in an image and extract the u, v position of the marker 13. The u, v position of the marker 13 is for example a corner of the marker 13. It is preferably also ensured that a focus and a shutter of the camera unit 5 are set to appropriate values so that the marker 13 can be found in the image for a region used in the calibration.

Figure 4:
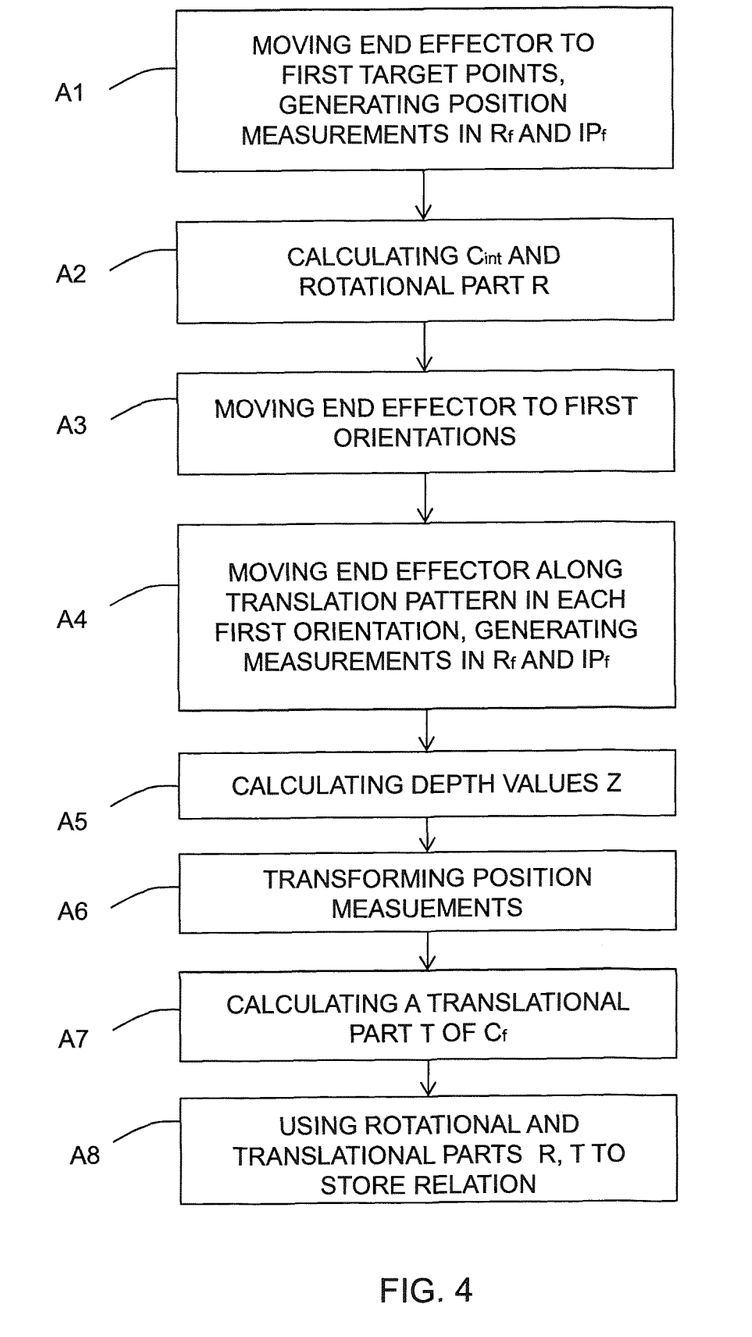
FIG. 4 is a flowchart of the method for calibrating a first coordinate system $R_f$ of a robot unit with a second coordinate system $C_f$ of an object identification unit.

A method for calibrating the first coordinate system $R_f$ of the robot unit 1 with the second coordinate system $C_f$ of the object identification unit 2 will now be described with reference to the flowchart in FIG. 4. The method comprises a first part where the intrinsic parameters of the camera unit 5 are determined, and a first approach to the extrinsic parameters of the camera unit 5 is determined. In a following second part, the determined first approach to the extrinsic parameters in the first part is corrected. It is here assumed that the calibration marker 13 is visible in a field of view of the camera unit 5. If not, an automatic correction routine can be performed as will be explained in the end of the method.

First Part

The method comprises moving the end effector 4 to a plurality of first target points wherein the first target points are chosen to include movement of the end effector 4 in all three axes of the first coordinate system $R_f$ of the robot unit 1 and wherein the end effector 4 maintains a same orientation (A1). A subset of these first target points may first be taught to the robot unit 1, before moving the end effector 5 to the first target points, to define where the robot unit 1 should execute the first part of the calibration. A direction essentially perpendicular to the first positions in the subset may also be taught to the robot unit 1 to define an approximate z-axis. Based on these taught first target points and the z-axis, the robot unit 1 may be configured to calculate the rest of the plurality of first target points. Preferably, the end effector 4 is moved to at least six target points in at least two planes, thus six target points where not all target points are in the same plane. For example, the taught target points may define four corners of a rectangle in a first plane. The robot unit 1, e.g. the computer unit 15, may then be configured to calculate first target points defining corners of a rectangle in a second and third plane parallel to the first plane in the z-direction. In this way movement of the end effector 4 in all three axes of the first coordinate system $C_f$ will be made. Also first target points defining the centre(s) of the rectangles may be calculated. These first target points may be stored for example in the computer readable storage medium 16 of the computer unit 15. The robot unit 1 is then controlled to move to each first target point while position measurements of the robot unit 1 in the first coordinate system $R_f$ are generated. According to one embodiment, also orientation measurements are made in each first target point such that it can be controlled that the end effector 4 has the same orientation in each first target point. Thus, pose measurements for the robot unit 1 are then made in each first target point. Further, in each first target point, position measurements in the image plane coordinate system $IP_f$ for the calibration marker 13 are generated with the object identification unit 2. Thus, the camera unit 5 takes an image of the calibration marker 13 in each first target point, and the information processing unit 6 identifies a u, v position of the calibration marker 13 in the image. The u, v position is e.g. a corner of the calibration marker 13.

When it is referred to moving the robot unit 1 to a certain point, orientation, pose or in a certain pattern, it means in the calibration method to move the tool flange 21 to a certain point, orientation, pose or in a certain pattern. When it is referred to measurements in the first coordinate system $R_f$, it is the position, orientation or pose of the tool flange 21 that is measured.

When position or pose measurements in the first coordinate system $R_f$ and position measurements in the image plane coordinate system $IP_f$ for the calibration marker 13 in each first target point are generated, these parameters can be saved e.g. in the computer readable storage medium 16 of the computer unit 15. The programming unit 17 is configured to make the calculations herein described.

Hereafter, the intrinsic parameters $C_{int}$ of the camera unit 5 and a rotational part of the second coordinate system $C_f$ of the object identification unit 2 are calculated based on the measurements in $R_f$ and $IP_f$ (A2). This can be done by calculating a projection matrix P in equation (3). Another possibility to find $C_{int}$ and the rotational part of $C_f$ is to use Direct Linear Transformation (DLT). As previously described, the projection matrix P includes two sub matrixes $C_{int}$ and $C_{ext}$ defining the intrinsic and extrinsic parameters of the object identification unit 2, thus the camera unit 5. $C_{int}$ defines the intrinsic parameters of the object identification unit 2, and $C_{ext}$ defines the extrinsic parameters of the object identification unit 2. The projection matrix P is a matrix which transforms the coordinates of the first target points in the first coordinate system $R_f$ to homogenous image coordinates (in $IP_f$). As the end effector 4 has not made any rotational movements when moving between the different first positions or when in the first positions, the relative translation of the calibration marker 13 is known from the robot unit 1 movements. The projection matrix can then be calculated in a manner known to person skilled in the art, and $C_{int}$ and $C_{ext}$ in equation (4) will be known.

If the exact location $T_f$ of the calibration marker 13 was known the calibration would now be finished. In practice the calibration marker 13 is often a sticker or printed paper and the exact location of a marker 13 is not known in the tool flange frame $T0_f$. An object of the invention is thus to solve this uncertainty.

As previously explained, the projection matrix P can be decomposed into two sub matrixes $C_{int}$ and $C_{ext}$. Provided that the robot unit 1 used the same orientation for all first target points in A1, the intrinsic parameters in $C_{int}$ will be correct. The orientation part of $C_{ext}$, that is R, will also be correct. The translational part of $C_{ext}$, that is T, will however be offset from the tool flange frame $T0_f$. The offset will be equal to the location $T_f$ of the calibration marker 13 relative to the tool flange frame $T0_f$. When a stationary camera unit 5 is calibrated to a robot unit 1 and both the position of the calibration marker 13 and $C_f$ are unknown they can be solved for simultaneously using a hand-eye calibration. In FIG. 1 a hand-mounted calibration marker 13 and a stationary camera unit 5 are illustrated, and the method is illustrated with this setup. The method may however also be used with a hand-mounted camera unit 5, and a stationary calibration marker 13.

The hand-eye calibration problem can be mathematically represented as solving a matrix equation on the form:

$$A \cdot X = X \cdot B \quad (7)$$

where A, B and X are all homogeneous transformation matrixes. X is unknown and sets of A and B can be constructed from the end effector 4 positions and the corresponding camera unit 5 measurements. Depending on how A and B are constructed, X can either be expressed in a coordinate system of the end effector 4, or the coordinate system $C_f$ of the image processing unit 2. For the hand-eye calibration to work a full pose measurement of the end effector 4 is required at each point. If a calibration checkerboard or similar is used and the intrinsic parameters of the camera unit 5 are known, a pose measurement can be made with reasonable accuracy. To get a good accuracy in the pose measurement the checkerboard needs to be of considerable size. For a calibration marker 13 that is permanently mounted on the end effector 4, it is normally not feasible to make accurate pose estimation, since the marker 13 will be small in relation to the total camera scene. It is thus desirable to use a method that does not need a pose measurement but can work with only u, v data for the calibration marker 13. The following second part of the method performs robot motions that make a calibration method using only the u, v measurement from the camera unit 5 possible (no orientation measurement from the camera unit 5 is needed and also no depth, Z).

Second Part

In the second part, the method further comprises moving the end effector 4 to a plurality of first orientations (A3), and for each of these orientations moving the end effector in a translation pattern while maintaining the same first orientation of the end effector 4 and generating position measurements in $R_f$ and $IP_f$ identifying the translation pattern (A4). The translation pattern may be essentially orthogonal to the optical axis of the camera unit 5. According to one embodiment, the method comprising moving the end effector 5 to at least three first orientations wherein the end effector 5 has a different orientation in each of the first orientations. For each orientation of the end effector 4, the end effector 4 performs a translational movement in a translation pattern such that the end effector 4 moves essentially in parallel with the image plane 19 defined by the axes $X_c$ and $Y_c$, thus a plane orthogonal to the optical axis 18. The translation pattern for each orientation consists of minimum two translational points. Several translational movements for each orientation can be made to improve accuracy. A translation pattern for a first orientation may thus include several translational movements of the robot unit 1. The orientation of the image plane 19 is known from the first part of the method, where the orientation part R of $C_{ext}$ was calculated. Using this knowledge, one or several translation patterns can be determined by the computer unit 15. The first orientations should be chosen such that a transition from one first orientation to another first orientation includes a reorientation around a first axis, and such that a transition from a further first orientation to a still further first orientation includes a reorientation around a second axis, where the first and the second axes are non-parallel axes. For example, one of the axes may be the optical axis 18 (FIG. 2). The calibration marker 13 will then be kept visible for the camera unit 5 also for large reorientations. The computer unit 15 is thus configured to use the calculated parameters from the first part of the method to determine the translation pattern(s) and the first orientations. The pattern(s) and the first orientations may then be used by the robot controller 9 to make the robot unit 1 move according to the translation pattern(s) and the first orientations.

In a further step A5, a depth value Z from the camera unit 5 to the calibration marker 13 is calculated for each first orientation based on the position measurements identifying the movement along the translation pattern. Since the translation pattern for each orientation in step A4 is made parallel to the camera unit 5 plane, the depth value Z along the $Z_c$-axis measured in the camera coordinate system $C_f$ will be constant for all positions in the translation pattern. Since the translational motion of the robot unit 1 is known for each position in the translation pattern, the depth value Z can be derived from the trigonometric relationship:

$$Z = f^* \cdot \frac{|u, v|}{m} \qquad (8)$$

where f is the focal length of the camera unit 5, $|u, v|$ is a measured length of the movement along the translation pattern in the image plane 19 and m is a length of the movement along the translation pattern in the coordinate system $R_f$ of the robot unit 1. The focal length f is given by the intrinsic parameters of the camera unit 5. According to one embodiment, the focal length f is here equal to $\alpha$ in equation (4). In this case $\alpha=\beta$. If $\alpha \neq \beta$, f can be set equal to $\alpha$ if the translational movement is made parallel to an axis of $C_f$, e.g. the $X_c$-axis.

An example how the depth value Z can be retrieved will now be explained. For example, the robot unit 1 is positioned in a first pose P1, with a first orientation R1 and a first position T11. The camera unit 5 now measures the position IP1 in pixel coordinates $u_{11}$, $v_{11}$ of the calibration marker 13. The robot unit 1 then makes a translational movement in a translation pattern to a second position T12, while maintaining the first orientation R1. The camera unit 5 now measures the position IP12 in pixel coordinates $u_{12}$, $v_{12}$ of the calibration marker 13. The distance $|u, v|$ between IP1 and IP12 can now be calculated as $|u_{11}-u_{12}, v_{11}-v_{12}|$. The distance m between T11 and T12 can be calculated as $|T11-T12|$. As $|u, v|$ and m now are known, Z can be determined using equ. (8). These steps are made for at least three first orientations, whereby a depth value Z is determined for each orientation.

If several translational movements are made in each first orientation, the depth value Z is determined by using mean values of the calculated lengths m and $|u, v|$ for each movement in a translation pattern. Several translational movements in each first orientation can be made to increase the accuracy.

Once a depth value Z for all the first orientations is identified, the u and v image coordinates from the measurements (IP1 . . . IPN) are transformed to Cartesian values $X_c$, $Y_c$, $Z_c$ ($C_1$ . . . $C_N$) in the second coordinate system $C_f$ of the object identification unit 2 (A6) using the relationship:

$$[X_c, Y_c, Z_c] = (C_{int})^{-1} \cdot [u, v, 1] \cdot Z \qquad (9)$$

The proceeding so far in the second part of the method leaves measurements pairs $P_1$, $C_1$-$P_N$, $C_N$ with pose measurements $P_1$-$P_N$ for the robot unit 1 in the first coordinate system $R_f$ and with corresponding position measurements $C_1$-$C_N$ for the camera unit 4 in the second coordinate system $C_f$ identifying the calibration marker 13. Based on these measurement pairs, a translational part of the second coordinate system $C_f$ of the object identification unit 2 is calculated based on the translation and reorientation between the second target points (A7). To do this, motion pairs based on the measurement pairs are formed and a hand-eye equation (7) is solved.

Since it is only the translational part of the second coordinate system $C_f$ that is unknown, the hand-eye equation (7) can be formulated as:

$$A \cdot x = b \qquad (10)$$

where A is a 3×3 matrix and x and b are 3×1 matrixes. A is a matrix describing rotation between different poses of the robot unit 1 in the first orientations, and b is a matrix describing a difference between the translation in $C_f$ and the translation in $R_f$ for the different poses. The equation is solved using a least square method.

Now an example of how the hand-eye equation (10) can be solved will be explained:

As previously has been explained, motion pairs can be formed based on the measurement pairs. A minimum of two measurement pairs including two poses $P_1$, $P_2$ and two measurements $C_1$, $C_2$ are used. $P_1$ and $P_2$ can each be formulated as a homogenous transformation matrix $[R_1 \ T_1; 0 \ 0 \ 0 \ 1]$ and $[R_2 \ T_2; 0 \ 0 \ 0 \ 1]$ respectively, where $R_1$ and $R_2$ are 3×3 rotational matrixes, and $T_1$ and $T_2$ are 3×1 translation matrixes. As the calibration marker 13 is placed on the end effector 4, the calibration marker 13 will follow the movement of the end effector 4. The orientation of the calibration marker 13 is thus the same as the orientation of the end effector 4. $C_1$ and $C_2$ can thus be expressed as $X_c$, $Y_c$, $Z_c$ values in $C_f$ without any orientation. $C_1$ and $C_2$ can each be formulated as a 3×1 translation matrix.

An equation $A_1$ describing a relative reorientation movement from $P_1$ to $P_2$ can be formulated as:

$$A_1 = R_1 \cdot (R_2)^{-1} - I \qquad (11)$$

where I is a 3×3 unitary matrix and $A_1$ is a 3×3 matrix. An equation $b_1$ describing the relative translational movement from $C_1$ to $C_2$ can be formulated as:

$$b_1 = (C_1 - C_2) - (T_1 - R_1 * (R_2)^{31\ 1} * T_2) \qquad (12)$$

where $b_1$ is a 3×1 matrix.

A first hand-eye equation can now be formulated using equations (11) and (12) as $$A_1 \cdot x = b_1 \qquad (13)$$

where x is the translational part T of $C_{ext}$, thus in $X_c$, $Y_c$ and $Z_c$ values. However, to solve the hand-eye equation (10), the procedure has to be repeated for at least a third measurement pair $P_3$, $C_3$ as the matrix $A_1$ is a singular matrix. For the third measurement pair and in line with the equations (11) and (12), the following expressions can be formulated:

$$A_2 = R_1 \cdot (R_3)^{-1} - I \qquad (14)$$

$$b_2 = (C_1 - C_3) - (T_1 - R_1 * (R_3)^{-1} * T_3) \qquad (15)$$

The matrix A in (10) can now be formulated by combining $A_1$ and $$A = \begin{bmatrix} A_1 \\ A_2 \end{bmatrix}.$$

For four measurements, three measurement pairs can be formed, and A has the size 9×3. Correspondingly, the vector b in (10) can be formulated by combining $b_1$ and $b_2$ into $$b = \begin{bmatrix} b_1 \\ b_2 \end{bmatrix}.$$

b is in the case with three measurement pairs a 9×1 matrix. The problem is overdetermined, and the equation (10) can be solved using a least-squares method. The result is $X_c$, $Y_c$ and $Z_c$ values for the calibration marker 13, thus the translational part T of $C_{ext}$.

When the hand-eye equation (10) has been solved, the translational part T of $C_f$ has been calculated, and the pose of the frame $C_f$ is fully known relative to $R_f$ and the calibration is complete. The rotational and the translational parts R and T are then used to store a relation between $R_f$ and $C_f$ to enable collaboration between the robot unit 1 and the object identification unit 2 (A8). Collaboration between the robot unit 1 and the object identification unit 2 includes coordinating what the camera unit 5 senses with actions of the robot unit 1.

The method may be executed automatically by the robot unit 1, for example initiated by an operator via a robot user interface. The calibration can now be done in some minutes, which previously took up to an hour. The result is more accurate than before, and saves a lot of time. The calibration parameters, thus the intrinsic and extrinsic parameters of the camera unit 5, may in the end of the method be given to the user via the robot unit interface. The motion pattern of the robot unit 1 is preferably also updated based on the intrinsic and extrinsic parameters, such that the camera unit 5 can give position measurements of objects that the robot unit 1 accurately can find and e.g. pick up or make work on.

When first target points, first orientations, translation patters etc. are calculated by the robot unit 1, there is a risk that some of the points will come out of the field of view of the camera unit 5, such that the calibration marker 13 is not visible in an image taken by the camera unit 5. To avoid such situations, the herein described method may be complemented with an automatic correction of these positions to find the calibration marker 13. For example, if the object identification unit 2 finds the calibration marker 13 in a position $A_r$ and the robot unit 1 then moves the end effector 4 for 200 mm in the $X_r$ direction to a position $B_r$, where the calibration marker 13 is out of the image taken by the camera unit 5, the robot unit 1 may reverse along the track until the calibration marker 13 again can be found in the image (e.g. reverse to 150 mm, check if the calibration marker 13 is in image, if not, reverse to 100 mm etc.). The same procedure can be made for re-orientations.

When making re-orientations, a first small re-orientation of ±10° can be done around the rotation axis, e.g. the tool flange coordinate system $T0_{fs}$ in a first step. A first approximation of the extrinsic parameters can then be done, and thus a first approximation of the coordinates $T_f$ of the calibration marker 13. With such small orientations the accuracy is however not very good, so in a second step the robot unit 1 makes a greater re-orientation between ±45°, but now around the first approximation of the coordinates of the calibration marker 13. This procedure makes sure that the calibration marker 13 stays in the image at the greater re-orientations, such that a high accuracy can be achieved in the estimation of $C_{ext}$.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for calibrating a first coordinate system $R_f$ of a robot unit with a second coordinate system $C_f$ of an object identification unit, wherein the robot unit comprises a robot arm with an end effector and the object identification unit comprises a camera unit, the end effector further comprises a calibration marker, the method comprises
    moving the end effector to a plurality of first target points wherein the first target points are chosen to include movement of the end effector in all three axes of the first coordinate system $R_f$ of the robot unit, and wherein the end effector maintains a same orientation, while generating position measurements in the first coordinate system $R_f$ and position measurements in an image plane coordinate system $IP_f$ for the calibration marker with the object identification unit for each first target points;
    calculating intrinsic parameters $C_{int}$ of the camera unit and a rotational part of the second coordinate system $C_f$ of the object identification unit based on the measurements in $R_f$ and $IP_f$;
    moving the end effector to a plurality of first orientations and for each of these orientations moving the end effector in a translation pattern to a second target point while maintaining the same first orientation of the end effector and while generating position measurements in $R_f$ and $IP_f$ identifying the translation pattern;
    calculating a depth value Z from the camera unit to the calibration marker for each second target point based on said position measurements identifying the movement along the translation pattern;
    transforming position measurements in pixels in $IP_f$ to position values in the second coordinate system $C_f$ based on the depth value Z and $C_{int}$;
    calculating a translational part of the second coordinate system $C_f$ of the object identification unit based on the translation and reorientation between the first orientations; and
    using the rotational and the translational parts to store a relation between $R_f$ and $C_f$ to enable collaboration between the robot unit and the object identification unit.

2. The method according to claim 1, wherein the step of calculating the translational part of the second coordinate system $C_f$ comprises solving a hand-eye equation $A \cdot x = b$, where A is a matrix describing rotation between different poses of the robot unit in said first orientations, and wherein b is a matrix describing a difference between the translation in $C_f$ and the translation in $R_f$ for the different poses.

3. The method according to claim 2, wherein the hand-eye equation is solved using a least square method.

4. The method according to claim 1, wherein the transforming step comprises transforming the position measurements in pixels in $IP_f$ to Cartesian values $X_c$, $Y_c$, Z in the second coordinate system $C_f$ of the object identification unit using an equation $(X_c, Y_c, Z)=(C_{int})^{-1} \cdot (u, v, 1) \cdot Z$.

5. The method according to claim 1, wherein Z is derived from the equation $$Z = f^* \cdot \frac{|u, v|}{m},$$

where f is the focal length of the camera unit, |u, v| is a length in an image and m is a length of a movement along the translation pattern.

6. The method according to claim 1, comprising teaching the robot unit a subset of said plurality of first target points before moving the end effector to the plurality of first target points.

7. The method according to claim 1, comprising moving the end effector to at least three first orientations, wherein the end effector has a different orientation in each of said first orientations.

8. The method according to claim 1, wherein the translation pattern is essentially orthogonal to an optical axis of the camera unit.

9. A robot controller having a programming unit configured to execute a method for calibrating a first coordinate system $R_f$ of a robot unit with a second coordinate system $C_f$ of an object identification unit, wherein the robot unit comprises a robot arm with an end effector and the object identification unit comprises a camera unit, the end effector further comprises a calibration marker, the method comprises moving the end effector to a plurality of first target points wherein the first target points are chosen to include movement of the end effector in all three axes of the first coordinate system $R_f$ of the robot unit, and wherein the end effector maintains a same orientation, while generating position measurements in the first coordinate system $R_f$ and position measurements in an image plane coordinate system $IP_f$ for the calibration marker with the object identification unit for each first target points;

calculating intrinsic parameters $C_{int}$ of the camera unit and a rotational part of the second coordinate system $C_f$ of the object identification unit based on the measurements in $R_f$ and $IP_f$;

moving the end effector to a plurality of first orientations and for each of these orientations moving the end effector in a translation pattern to a second target point while maintaining the same first orientation of the end effector and while generating position measurements in $R_f$ and $IP_f$ identifying the translation pattern;

calculating a depth value Z from the camera unit to the calibration marker for each second target point based on said position measurements identifying the movement along the translation pattern;

transforming position measurements in pixels in $IP_f$ to position values in the second coordinate system $C_f$ based on the depth value Z and $C_{int}$;

calculating a translational part of the second coordinate system $C_f$ of the object identification unit based on the translation and reorientation between the first orientations; and using the rotational and the translational parts to store a relation between $R_f$ and $C_f$ to enable collaboration between the robot unit and the object identification unit.

10. A robot unit comprising an object identification unit, wherein the robot unit is configured to execute a method for calibrating a first coordinate system $R_f$ of the robot unit with a second coordinate system $C_f$ of the object identification unit, wherein the robot unit further comprises a robot arm with an end effector and the object identification unit comprises a camera unit, the end effector further comprises a calibration marker, the method comprises moving the end effector to a plurality of first target points wherein the first target points are chosen to include movement of the end effector in all three axes of the first coordinate system $R_f$ of the robot unit, and wherein the end effector maintains a same orientation, while generating position measurements in the first coordinate system $R_f$ and position measurements in an image plane coordinate system $IP_f$ for the calibration marker with the object identification unit for each first target points;

calculating intrinsic parameters $C_{int}$ of the camera unit and a rotational part of the second coordinate system $C_f$ of the object identification unit based on the measurements in $R_f$ and $IP_f$;

moving the end effector to a plurality of first orientations and for each of these orientations moving the end effector in a translation pattern to a second target point while maintaining the same first orientation of the end effector and while generating position measurements in $R_f$ and $IP_f$ identifying the translation pattern;

calculating a depth value Z from the camera unit to the calibration marker for each second target point based on said position measurements identifying the movement along the translation pattern;

transforming position measurements in pixels in $IP_f$ to position values in the second coordinate system $C_f$ based on the depth value Z and $C_{int}$;

calculating a translational part of the second coordinate system $C_f$ of the object identification unit based on the translation and reorientation between the first orientations; and using the rotational and the translational parts to store a relation between $R_f$ and $C_f$ to enable collaboration between the robot unit and the object identification unit.

11. A computer product comprising a non-transitory computer readable medium storing computer instructions to perform, when the computer instructions are executed on a computer unit, a method for calibrating a first coordinate system $R_f$ of a robot unit with a second coordinate system $C_f$ of an object identification unit, wherein the robot unit comprises a robot arm with an end effector and the object identification unit comprises a camera unit, the end effector further comprises a calibration marker, the method comprises moving the end effector to a plurality of first target points wherein the first target points are chosen to include movement of the end effector in all three axes of the first coordinate system $R_f$ of the robot unit, and wherein the end effector maintains a same orientation, while generating position measurements in the first coordinate system $R_f$ and position measurements in an image plane coordinate system $IP_f$ for the calibration marker with the object identification unit for each first target points;

calculating intrinsic parameters C of the camera unit and a rotational part of the second coordinate system $C_f$ of the object identification unit based on the measurements in $R_f$ and $IP_f$;

moving the end effector to a plurality of first orientations and for each of these orientations moving the end effector in a translation pattern to a second target point while maintaining the same first orientation of the end effector and while generating position measurements in $R_f$ and $IP_f$ identifying the translation pattern;

calculating a depth value Z from the camera unit to the calibration marker for each second target point based on said position measurements identifying the movement along the translation pattern;

transforming position measurements in pixels in $IP_f$ to position values in the second coordinate system $C_f$ based on the depth value Z and $C_{int}$;

calculating a translational part of the second coordinate system $C_f$ of the object identification unit based on the translation and reorientation between the first orientations; and using the rotational and the translational parts to store a relation between $R_f$ and $C_f$ to enable collaboration between the robot unit and the object identification unit.

12. A robot system comprising a robot unit defining a first coordinate system $R_f$, wherein the robot unit comprises a robot arm with an end effector;

an object identification unit defining a second coordinate system $C_f$, wherein the object identification unit comprises a camera unit;

a calibration marker on the end effector;

a computer unit with a programming unit and a computer readable storage medium storing computer instructions operable to cause the programming unit to perform operations comprising:

moving the end effector to a plurality of first target points wherein the first target points are chosen to include movement of the end effector in all three axes of the first coordinate system $R_f$ of the robot unit, and wherein the end effector maintains a same orientation, while generating position measurements in the first coordinate system $R_f$ and position measurements in an image plane coordinate system $IP_f$ for the calibration marker with the object identification unit for each first target points;

calculating intrinsic parameters $C_{int}$ of the camera unit and a rotational part of the second coordinate system $C_f$ of the object identification unit based on the measurements in $R_f$ and $IP_f$;

moving the end effector to a plurality of first orientations and for each of these first orientations moving the end effector in a translation pattern to a second target point while maintaining the same first orientation of the end effector and while generating position measurements in $R_f$ and $IP_f$ identifying the translation pattern;

calculating a depth value Z from the camera unit to the calibration marker for each first orientation based on said position measurements identifying the translation pattern;

transforming position measurements in pixels in $IP_f$ to position values in the second coordinate system $C_f$ based on the depth value Z and $C_{int}$;

calculating a translational part of the second coordinate system $C_f$ of the object identification unit based on the translation and reorientation between the first orientations; and using the rotational and the translational parts to store a relation between $R_f$ and $C_f$ to enable collaboration between the robot unit and the object identification unit.

\* \* \* \* \*